United States Patent
Künzler et al.

(10) Patent No.: US 6,762,264 B2
(45) Date of Patent: Jul. 13, 2004

(54) CONTACT LENS MATERIAL

(75) Inventors: Jay F. Künzler, Canandaigua, NY (US); Arthur W. Martin, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 10/293,056

(22) Filed: Nov. 12, 2002

(65) Prior Publication Data

US 2003/0109637 A1 Jun. 12, 2003

Related U.S. Application Data

(63) Continuation of application No. 09/598,416, filed on Jun. 20, 2000, now abandoned.
(60) Provisional application No. 60/145,908, filed on Jul. 27, 1999.

(51) Int. Cl.$^7$ .............................................. C08F 230/08
(52) U.S. Cl. ..................... 526/279; 528/32; 351/160 H; 623/656; 623/659
(58) Field of Search .......................... 526/279; 528/32; 351/160 H; 623/656, 659

(56) References Cited

U.S. PATENT DOCUMENTS

| | | | |
|---|---|---|---|
| 3,159,646 A | 12/1964 | Milionis et al. | 260/308 |
| 3,408,429 A | 10/1968 | Wichterie | 264/1 |
| 3,496,254 A | 2/1970 | Wichterle | 264/1 |
| 3,761,272 A | 9/1973 | Mannens et al. | 96/84 |
| 4,136,250 A | 1/1979 | Mueller et al. | 528/29 |
| 4,153,641 A | 5/1979 | Deichert et al. | 260/827 |
| 4,189,546 A | 2/1980 | Deichert et al. | 528/26 |
| 4,208,506 A | 6/1980 | Deichert et al. | 528/32 |
| 4,217,038 A | 8/1980 | Letter et al. | 351/160 |
| 4,277,595 A | 7/1981 | Deichert et al. | 528/26 |
| 4,304,895 A | 12/1981 | Loshaek | 526/313 |
| 4,327,203 A | 4/1982 | Deichert et al. | 526/279 |
| 4,355,147 A | 10/1982 | Deichert et al. | 526/264 |
| 4,528,311 A | 7/1985 | Beard et al. | 524/91 |
| 4,716,234 A | 12/1987 | Dunks et al. | 548/259 |
| 4,719,248 A | 1/1988 | Bambury et al. | 523/108 |
| 4,740,533 A | 4/1988 | Su et al. | 523/106 |
| 4,780,515 A | 10/1988 | Deichert | 526/245 |
| 4,870,149 A | 9/1989 | Hara et al. | 528/15 |
| 4,997,897 A | 3/1991 | Melpolder | 526/284 |
| 5,034,461 A | 7/1991 | Lai et al. | 525/100 |
| 5,070,215 A | 12/1991 | Bambury et al. | 556/418 |
| 5,271,875 A | 12/1993 | Appleton et al. | 264/2.3 |
| 5,310,779 A | 5/1994 | Lai | 524/588 |
| 5,346,976 A | 9/1994 | Ellis et al. | 526/279 |
| 5,358,995 A | 10/1994 | Lai et al. | 524/547 |
| 5,374,662 A | 12/1994 | Lai et al. | 522/172 |
| 5,387,632 A | 2/1995 | Lai et al. | 526/279 |
| 5,387,663 A | 2/1995 | McGee et al. | 526/279 |
| 5,420,324 A | 5/1995 | Lai et al. | 523/107 |
| 5,496,871 A | 3/1996 | Lai et al. | 523/107 |
| 5,998,498 A * | 12/1999 | Vanderlaan et al. | 523/107 |

OTHER PUBLICATIONS

Kunzler, et al., Contact Lens Material, Chemistry & Industry, pp. 651–655, Aug. 21, 1995.

* cited by examiner

*Primary Examiner*—Margaret G. Moore
(74) *Attorney, Agent, or Firm*—Glenn D. Smith; John E. Thomas

(57) ABSTRACT

A method for reducing the modulus of polymer silicone hydrogel compositions by employing monomeric polysiloxanes endcapped with trimethylsilyl to reduce the crosslinking density of the hydrogel. The synthesis consists of a single vessel acid catalyzed ring opening polymerization and may be employed to produce copolymers useful as hydrogel contact lens materials.

18 Claims, No Drawings

CONTACT LENS MATERIAL

This application is a continuation of U.S. Ser. No. 09/598,416, filed Jun. 20, 2000, now abandoned.

BACKGROUND OF THE INVENTION

The present invention generally relates to silicone hydrogel compositions useful as biomedical devices, such as contact lenses and intraocular lenses.

Polymeric silicone materials have been used in a variety of biomedical applications, including, for example, in contact lenses and intraocular lenses. Such materials can generally be subdivided into hydrogels and non-hydrogels. Silicone hydrogels constitute crosslinked polymeric systems that can absorb and retain water in an equilibrium state and generally have a water content greater than about 5 weight percent and more commonly between about 10 to about 80 weight percent. Such materials are usually prepared by polymerizing a mixture containing at least one silicone-containing monomer and at least one hydrophilic monomer. Either the silicone-containing monomer or the hydrophilic monomer may function as a crosslinking agent (a crosslinker being defined as a monomer having multiple polymerizable functionalities) or a separate crosslinker may be employed.

Silicone hydrogels combine the beneficial properties of hydrogels with those of silicone-containing polymers (Kunzler and McGee, "Contact Lens Materials", *Chemistry & Industry*, pp. 651–655, 21 August 1995). Silicone hydrogels have been used to produce a contact lens that combines the high oxygen permeability of polydimethylsiloxane (PDMS) materials with the comfort, wetting and deposit resistance of conventional non-ionic hydrogels.

Monomers that have been found to be particularly useful for preparing silicone-containing contact lenses are described in U.S. Pat. Nos. 4,136,250; 4,153,641; 4,189,546; 4,208,506; 4,217,038; 4,277,595; 4,327,203; 4,355,147; 4,740,533; 4,780,515; 5,034,461; 5,070,215; 5,310,779; 5,346,976; 5,374,662; 5,358,995; 5,387,632; 5,420,324; and 5,496,871.

U.S. Pat. No. 4,153,641 (Deichert et al) discloses contact lenses made from poly(organosiloxane) monomers which are α, ω terminally bonded through a divalent hydrocarbon group to a polymerized activated unsaturated group. Various hydrophobic silicone-containing prepolymers such as 1,3-bis(methacryloxyalkyl)-polysiloxanes were copolymerized with known hydrophilic monomers such as 2-hydroxyethyl methacrylate (HEMA). These materials were used to produce lenses which had a low water content and a high modulus (greater than 300 g/mm$^2$).

U.S. Pat. No. 5,358,995 (Lai et al) describes a silicone hydrogel which is comprised of an acrylic ester-capped polysiloxane prepolymer, polymerized with a bulky polysiloxanyalkyl (meth)acrylate monomer, and at least one hydrophilic monomer. The acrylic ester-capped polysiloxane prepolymer, commonly known as M$_2$D$_x$ consists of two acrylic ester end groups and "x" number of repeating dimethylsiloxane units. The preferred bulky polysiloxanyakyl (meth)acrylate monomers are TRIS-type (methacryloxypropyl tris(trimethylsiloxy)silane) with the hydrophilic monomers being either acrylic- or vinyl-containing. While the properties of these lenses are acceptable, the modulus of these lenses can be high, which may result in damage to the epithelial layer and poor comfort.

Designing silicone based hydrogels utilizing M$_2$D$_x$ as the base prepolymer has mainly involved copolymerizing the prepolymer with hydrophilic monomers, such as dimethylacrylamide and N-vinylpyrrolidone. Silicone is hydrophobic and has poor compatibility with hydrophilic monomers, especially when the M$_2$D$_x$ prepolymer is of high molecular weight. Poor compatibility results in phase separated, opaque materials. This can be particularly problematic when preparing hydrogels to be used as optically clear contact lenses.

Reducing the molecular weight of the M$_2$D$_x$ prepolymer can improve the incompatibility. Unfortunately, low molecular weight M$_2$D$_x$ prepolymers typically result in hydrogels of high modulus. This is a direct result of the higher crosslink density of these low molecular weight M$_2$D$_x$ based hydrogels.

In designing a low modulus silicone hydrogel based on low molecular weight M$_2$D$_x$ prepolymers, one approach can be to use high concentrations of hydrophilic monomers. The lower modulus for these materials is a result of the higher water content and lower cross-link density. The major drawback of this approach is that the higher water content materials possess lower levels of oxygen permeability, due to the lower concentration of silicone in these materials. The low levels of oxygen permeability are not suitable for continuous wear contact lens application.

Another approach in the development of low modulus silicone hydrogels based on low molecular weight M$_2$D$_x$ prepolymers is through the incorporation of the monomer methacryloxypropyl tris(trimethylsiloxy)silane ("TRIS"). Higher concentrations of TRIS results in hydrogels of lower modulus, but lenses made with high TRIS levels overall tend not to perform well in clinical studies.

The development of low modulus hydrogels based on low molecular weight M$_2$D$_x$ prepolymers may be accomplished through the addition of silicone macromonomers, such as those taught by Y. Kawakami in *Polymer Journal*, v. 14, p. 913, 1982. High levels of silicone macromonomer may reduce the modulus by lowering the cross-link density of the resultant hydrogel without a significant reduction in oxygen permeability. The major disadvantage of this route is that the methacrylate based silicone macromonomers are very difficult to synthesize. The synthesis of siloxane macromonomers requires several steps.

SUMMARY OF THE INVENTION

There remains a need for a contact lens material having the high oxygen permeablity of a polysiloxane-containing prepolymer, yet have a modulus low enough to be used as a contact lens. The approach taken in this invention alters the silicone-containing monomer to affect the polymer properties. By lowering the methacrylate functionality of M$_2$D$_x$ the cross-linking density is reduced. This can be done by removing a percentage of the methacrylate groups on the end of the prepolymer.

These improved polymer silicone hydrogel compositions are formed from the polymerization product of a monomer mixture comprising a silicone prepolymer having the general formula:

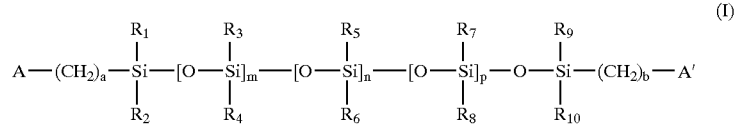

(I)

wherein;
A is an activated unsaturated radical;
A' is either an activated unsaturated radical or an alkyl group;
$R_1-R_{10}$ are independently an alkyl, fluoroalkyl, alcohol, ether, or fluoroether group having 1–10 carbons, or an aromatic group having 6–18 carbons;
m, n, and p are independently 0 to 200, m+n+p being from about 15 to 200;
a is 1 to 10; and
b is 0 to 10, mers. The $M_2D_x$ prepolymers of this invention contain a "built-in" modulus reducing functionality: a trimethylsilyl (TMS) endcap. Increasing the concentration of the TMS endcap (or reducing the concentration of the methacrylate cap) results in lower modulus, transparent silicone hydrogels without a reduction in water transport or oxygen permeability.

These improved polymer silicone hydrogel compositions are formed from the polymerization product of a monomer mixture comprising a silicone prepolymer having the general formula:

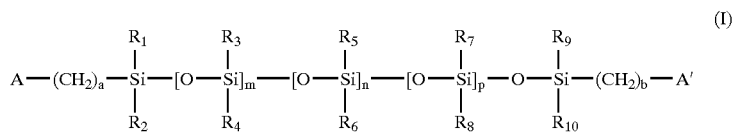

(I)

wherein the silicone prepolymer is prepared by the reaction of dimethacrylate disiloxane ($M_2$) and cyclic siloxane (D) in the presence of an catalyst, the improvement comprising adding at least one disiloxane ($T_2$) having the formula:

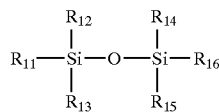

wherein
$R_{11}-R_{16}$ are independently an alkyl group having 1–5 carbons, to the reaction mixture used to form the silicone prepolymer.

In particular, this invention is directed to preparing a $M_2D_x$ based prepolymer that is endcapped with trimethylsilyl (TMS) as shown in formula II:

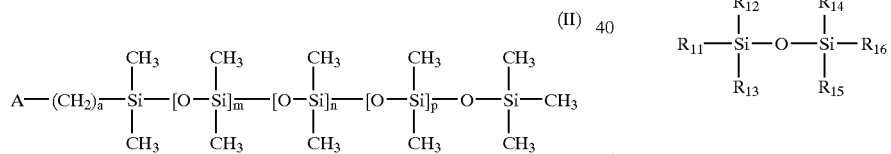

(II)

wherein m+n+p is 15 to 200.

Note that prepolymers of formula II are a species of formula I wherein b is zero and $R_9, R_{10}$ and A' are methyl groups.

Applicants have found that the above preparation of making the prepolymer is especially effective in improving the flexibility of polymer silicone materials and hence lowering the modulus of silicone hydrogel copolymers, in contrast to previous siloxane compounds which were methacrylate endcapped and not endcapped with trimethyl silyl. The synthesis of the $M_2D_x$, TMS-endcapped prepolymer is easy, requiring fewer steps and components than previous methods.

The hydrogel material is especially useful in biomedical devices such as soft contact lenses, intraocular lenses, heart valves and other prostheses.

DETAILED DESCRIPTION OF PREFERRED EMBODIMENTS

This invention describes a novel approach to the design of low modulus silicone hydrogels based on $M_2D_x$ prepolywherein;
A is an activated unsaturated radical;
A' is either an activated unsaturated radical or an alkyl group;
$R_1-R_{10}$ are independently an alkyl, fluoroalkyl, alcohol, ether, or fluoroether group having 1–10 carbons, or an aromatic group having 6 18 carbons;
m, n, and p are independently 0 to 200, m+n+p being from about 15 to 200;
a is 1 to 10; and
b is 0 to 10,
wherein the silicone prepolymer is prepared by the reaction of dimethacrylate disiloxane ($M_2$) and cyclic siloxane (D) in the presence of an catalyst, the improvement comprising adding at least one disiloxane ($T_2$) having the formula:

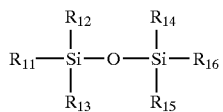

wherein $R_{11}-R_{16}$ are independently an alkyl group having 1–5 carbons, to the reaction mixture used to form the silicone prepolymer.

With respect to A, A' of formula I, the term "activated is used to describe unsaturated groups which include at least one substituent which facilitates free radical polymerization, preferably an ethylenically unsaturated radical. This includes esters or amides of acrylic or methacrylic acid represented by the general formula:

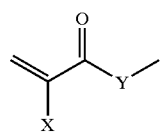

wherein X is preferably hydrogen or methyl but may include other groups, e.g., cyano, and Y represents —O—, —S—, or —NH—, but is preferably —O—. Examples of other suitable activated unsaturated groups include vinyl carbonates, vinyl carbainates, fumarates, fumaramides, maleates, acrylonitryl, vinyl ether and styrl.

Dimethacrylate disiloxane ($M_2$) is represented by the general formula:

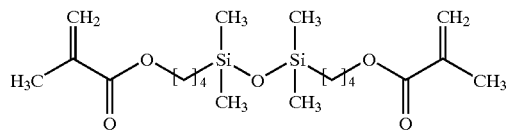

Cyclic siloxane (D) may be any cyclical compound and substitute analogs containing at least 3 silicone-oxygen groups. Examples include 1,1,3,3-tetramethyl-1,3-disila-2-oxacyclopentane, hexamethylcyclotrisiloxane and octamethylcyclotetrasiloxane or mixtures thereof. The preferred D is octamethylcyclotetrasiloxane ($D_4$).

The preferred $T_2$ is hexamethyl disiloxane and is represented by the following formula:

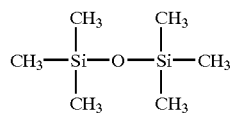

The catalyst used must be able to cleave Si—O bonds. Those agents include acid clays, hydrogen fluoride acid, HCl—FeCl3 (hydrochloric acid-iron(III) chloride complex), concentrated sulfuric acid, and trifluoromethane sulfonic (triflic) acid. The preferred acids are concentrated sulfuric acid and triflic acid.

The present invention contemplates polymerizing polysiloxane prepolymer mixture with bulky polysiloxanylalkyl (meth)acrylate monomers and at least one hydrophilic monomer. The polysiloxane prepolymers utilized in this invention are those having m+n+p equal to about 15 to 200 repeating dimethylsiloxane units. Preferred polysiloxane prepolymers are those having about 25 to about 50 repeating dimethylsiloxane units. More preferred polysiloxane prepolymers are those in which there are 25 repeating dimethylsiloxane units.

It is preferred that the total concentration of the prepolymer is endcapped with 1 to 70 mole % trialkylsilyl, preferably 25 to 50 mole % trialkylsilyl and more preferably 40 to 50 mole % trialkylsilyl. Thus, "prepolymer" as used herein denotes a compound having formulae (I) and (II):

equilibrium state. These polymeric systems are based on at least one silicone-containing monomer and at least one hydrophilic monomer. Preferably, the silicone hydrogels of this invention are formed by polymerizing a monomer which comprises the prepolymer mixture of this invention, a second unsaturated silicone-containing monomer and at least one hydrophilic monomer. More preferably, the second unsaturated silicone-containing monomer may include monofunctional silicone-containing monomers. Most preferably, the monofunctional silicone-containing monomer is at least one member of the group consisting of bulky polysiloxanylalkyl (meth)acrylic monomers are represented by Formula (III):

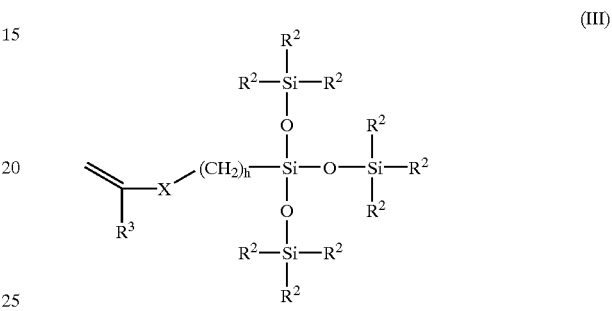

wherein:
X denotes —COO—, —CONR$^4$—, —OCOO—, or —OCONR$^4$— where each where R$^4$ is independently H or lower alkyl; R$^3$ denotes hydrogen or methyl; h is 1 to 10; and each R$^2$ independently denotes a lower alkyl radical, a phenyl radical or a radical of the formula —Si(R$^5$)$_3$ wherein each R$^5$ is independently a lower alkyl radical or a phenyl radical.

Such bulky monomers specifically include methacryloxypropyl tris(trimethylsiloxy)silane ("TRIS"), pentamethyldisiloxanyl methylmethacrylate, tris(trimethylsiloxy) methacryloxy propylsilane, phenyltetramethyl-disiloxanylethyl acrylate, methyldi(trimethylsiloxy)methacryloxymethyl silane, 3-[tris(trimethylsiloxy)silyl]propyl vinyl carbatnate, 3-[tris(trimethylsiloxy)silyl]propyl allyl carbamate, and 3-[tris(trimethylsiloxy)silyl]propyl vinyl carbonate.

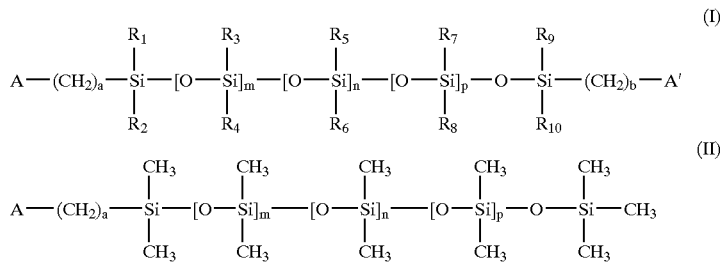

These $M_2D_x$, TMS-endcapped prepolymers are extremely easy to synthesize. The synthesis consists of an acid catalyzed, ring opening polymerization conducted in a single vessel. The cyclic siloxanes (D), endcapping agents ($M_2$) and disiloxanes ($T_2$) are simply added to a reaction vessel together with a suitable catalyst and stirred at room temperature for a period of time.

Silicone hydrogels of this invention are crosslinked polymeric systems that can absorb and retain water in an Preferred hydrophilic monomers may be either acrylic- or vinyl-containing. The term "vinyl-type" or vinyl-containing" monomers refers to monomers containing the vinyl grouping ($CH_2$=CHR) and are generally reactive. Such hydrophilic vinyl-containing monomers are known to polymerize relatively easily. Acrylic-containing monomers are those monomers containing the acrylic group ($CH_2$=CRCOX) wherein R=H or $CH_3$ and X=O or NH, which are also known to polymerize readily.

Examples of suitable hydrophilic monomers include: unsaturated carboxylic acids, such as methacrylic and acrylic acids; acrylic substituted alcohols, such as 2-hydroxyethyl methacrylate and 2-hydroxyethylacrylate; vinyl lactams, such as N-vinyl pyrrolidone; and acrylamides, such as methacrylamide with N,N-dimethyl acrylamide (DMA) being the most preferred. Other monomers include glycerol methacrylate and 2-hydroxyethyl methacrylamide.

Silicone hydrogels of this invention are typically formed by polymerizing a monomer mixture comprising: about 10 to about 90 weight percent of a prepolymer, preferably 20 to 70 weight percent of a prepolymer, more preferably 20 to 50 weight percent, comprised of monomers represented by formula I and formula II wherein the total concentration of the prepolymer is endcapped with about 1 to about 70 mole % trimethylsilyl, preferably about 25 to about 50 mole % trimethylsilyl, more preferably about 40 to about 50 mole % trimethylsilyl; about 10 to about 50 weight percent of a monofunctional ethylenically unsaturated silicone-containing monomer, more preferably about 20 to about 50 weight percent of a monofunctional ethylenically unsaturated silicone-containing monomer, more preferably about 20 to about 40 weight percent of a monofunctional ethylenically unsaturated silicone-containing monomer; and about 5 to about 70 weight percent of a hydrophilic monomer, preferably 10 to about 50 weight percent of a hydrophilic monomer, more preferably about 20 to about 40 weight percent of a hydrophilic monomer. An example of a silicone hydrogel made from this invention may have about 20 parts of a prepolymer that is endcapped with 50 mole % TMS, about 35 parts of a hydrophilic monomer, about 25 parts of an monofunctional ethylenically unsaturated silicone-containing monomer. Other components, such as a diluent may be added and are discussed below.

The monomer mixture of the present invention may include additional constituents such as UV-absorbing agents, internal wetting agents, hydrophilic monomeric units, toughening agents, or colorants such as those known in the contact lens art.

Conventional curing methods in polymerizing ethylenically unsaturated compounds such as UV polymerization, thermal polymerization, or combinations thereof, can be used to cast these monomer mixtures. Representative free radical thermal polymerization initiators can be organic peroxides and are usually present in the concentration of about 0.01 to 1 percent by weight of the total monomer mixture. Representative UV initiators are known in the field such as, benzoin methyl ether, benzoin ethyl ether, 1164, 2273, 1116, 2959, 3331 (EM Industries) and Irgacure 651 and 184 (Ciba-Geigy). In the preferred embodiment, Darocur 1173 is the UV initiator.

Polymerization of the prepolymer of this invention with other copolymers is generally performed in the presence of a diluent. The diluent is generally removed after polymerization and replaced with water in extraction and hydration protocols well known to those skilled in the art. Representative diluents are diols, alcohols, alcohol/water mixtures, ethyleneglycol, glycerine, liquid polyethyleneglycol, low molecular weight linear polyhydroxyethylmethacrylates, glycol esters of lactic acid, formamides, ketones, dialkylsulfoxides, butyl carbitol, and the like. Preferred diluents include hexanol and nonanol.

It is also possible to perform the polymerization in the absence of diluent to produce a xerogel. These xerogels may then be hydrated to form hydrogels as is well known in the art.

The monomer mixture may include a tinting agent, defined as an agent that, when incorporated in the final lens, imparts some degree of color to the lens. Conventional tinting agents are known in the art, including non-polymerizable agents, or polymerizable agents that include an activated unsaturated group that is reactive with the lens-forming monomers. One preferred example of this latter class is the compound 1,4-bis(4-(2-methacryloxyethyl)phenylamino)anthraquinone, a blue visibility-tinting agent disclosed in U.S. Pat. No. 4,997,897 (Melpolder).

The monomer mixture may also include a UV-absorbing agent, defined as an agent that reduces light in the general region of 200 to 400 nm. Representative polymerizable UV absorbing materials for contact lens applications are described in U.S. Pat. No. 4,304,895 (Loshaek), U.S. Pat. No. 4,528,311 (Beard et al), U.S. Pat. No. 4,716,234 (Dunks et al), U.S. Pat. No. 4,719,248 (Bambury et al), U.S. Pat. No. 3,159,646 (Milionis et al) and U.S. Pat. No. 3,761,272 (Manneus et al). Examples of UV-absorbing compounds include the benzotriazoles and benzophenones.

Various techniques for molding hydrogel polymer mixtures into contact lenses are known in the art, including spin casting and static cast molding. Spin casting processes are disclosed in U.S. Pat. Nos. 3,408,429 and 3,496,254. Static cast molding involves charging a quantity of polymerizable monomeric mixture to a mold assembly, and curing the monomeric mixture while retained in the mold assembly to form a lens, for example, by free radical polymerization of the monomeric mixture. Examples of free radical reaction techniques to cure the lens material include thermal radiation, infrared radiation, electron beam radiation, gammma radiation, ultraviolet (UV) radiation, and the like; combinations of such techniques may be used. The mold assembly defines a mold cavity for casting the lens, including an anterior mold for defining the anterior lens surface and a posterior mold for defining the posterior lens surface.

U.S. Pat. No. 5,271,875 describes a static cast molding method that permits molding of a finished lens in a mold cavity defined by a posterior mold and an anterior mold.

The hydrogels of the present invention are oxygen transporting, hydrolytically stable, biologically inert and transparent. When used in the formation of contact lenses, it is preferred that the subject hydrogels have water contents of from about 5 to about 70 weight percent. More preferred is about 25 to about 50 weight percent. Furthermore, it is preferred that such hydrogels have a modulus from about 20 g/mm$^2$ to about 200 g/mm$^2$, and more preferably from about 75 g/mm$^2$ to about 175 g/mm$^2$.

As stated previously, the $M_2D_x$, TMS-endcapped prepolymers are extremely easy to synthesize. There are fewer steps and components needed than found in previously known methods. This reduces the cost and time necessary for producing the hydrogels or contact lenses.

As an illustration of the present invention, several examples are provided below. These examples serve only to further illustrate aspects of the invention and should not be construed as limiting the invention.

EXAMPLE 1

Preparation of 1,3-bis(4-methacryloyloxybutyl) Tetramethyl Disiloxane ($M_2$)

To a 5 liter four neck resin flask equipped with a mechanical stirrer, Dean-Stark trap, heating mantle, water cooled condenser and thermometer was added 1,1-dimethyl-1-sila-2-oxacyclohexane (521 g, 4.0 mol), methacrylic acid (361 g, 4.2 mol), and concentrated sulfuric acid (25.5 g). To the reaction mixture was then added 1L of cyclohexane and hydroquinone (0.95 g, 8.6 mmol) as a polymerization inhibitor. The reaction mixture was heated to reflux for five hours during which time 28 mL of water was collected. The reaction mixture was then cooled, divided and passed through two chromatography columns filled with 1 kg of alumina (packed using cyclohexane as eluent). The cyclohexane was removed using a rotary evaporator and the resultant $M_2$ was placed under vacuum (0.2 mm Hg) for one hour at 80° C. (yield, 80%; purity by gas chromatography, 96%).

EXAMPLE 2

Synthesis of Methacrylate End-Capped Poly Dimethylsiloxane ($M_2D_{25}$)

To a 1,000-mL round-bottom flask under dry nitrogen was added octamethylcyclotetrasiloxane ($D_4$)(371.0 g, 1.25 mol) and $M_2$(27.7 g, 0.7 mol). Triflic acid (0.25%, 1.25 g, 8.3 mmol) was added as initiator. The reaction mixture was stirred for 24 hours with vigorous stirring at room temperature. Sodium bicarbonate (10 g, 0.119 mol) was then added and the reaction mixture was again stirred for 24 hours. The resultant solution was filtered through a 0.3-μm-pore-size Teflon® filter. The filtered solution was vacuum stripped and placed under vacuum (>0.1 mm Hg) at 50° C. to remove the unreacted silicone cyclics. The resulting silicone hydride-functionalized siloxane was a viscous, clear fluid: yield, 70%.

Comparative Examples 3–16

Formulations of the Hydrogel with Varying Ratios

Formulations comprising the following substituents were prepared: α, ω-Bis(methacryloxyalkyl)polysiloxane ($M_2D_{25}$), methacryloxypropyl tris(trimethylsiloxy)silane ("TRIS") and N,N-dimethyl acrylamide (DMA). Each formulation contained a constant amount of hexanol as solvent (20 parts) and Darocur-1173 as a photoinitiator (0.5 parts). All formulations were UV-cured between two glass plates for two (2) hours at room temperature. The resultant films were isolated, followed by extraction with ethanol for sixteen (16) hours and boiling water hydration for four (4) hours, then placed in borate buffered saline. The ratios of the various substituents were varied, with the resulting properties noted.

The water contents and isopropanol extractables for films cast according to the procedures set forth above were measured gravimetrically. The tensile and tear properties were determined in buffered saline, according to the standard ASTM procedures 1708 and 1938 respectively. The oxygen permeabilities were determined by polargraphic methods taking the edge effect into consideration. (See Fatt, Rasson and Melpolder, *Int'l Contact Lens Clinic*, v. 14, 389 (1987)).

TABLE 1

Films prepared using $M_2D_{25}$ endcapped with 0% mole trimethylsilyl

| Example | DMA (parts) | TRIS (parts) | $M_2D_{25}$ (parts) | DK (Barrers) | $H_2O$ (%) | Weight Loss (%) | Modulus (g/mm²) | $H_2O$ trans |
|---|---|---|---|---|---|---|---|---|
| 3 | 20.00 | 39.50 | 20.00 | 179.00 | 11.61 | 17.83 | 181 | 1.05 |
| 4 | 23.95 | 33.10 | 22.45 | 131.60 | 17.94 | 19.25 | 223 | 14.91 |
| 5 | 35.00 | 24.50 | 20.00 | 85.00 | 32.70 | 21.19 | 212 | 79.96 |
| 6 | 35.00 | 20.00 | 24.50 | 196.00 | 32.19 | 21.48 | 290 | 91.35 |
| 7 | 20.00 | 29.50 | 30.00 | 181.90 | 10.65 | 17.72 | 306 | 9.03 |
| 8 | 20.00 | 39.50 | 20.00 | 189.30 | 10.12 | 18.81 | 204 | 4.53 |
| 9 | 20.00 | 34.50 | 25.00 | 139.40 | 11.56 | 18.65 | 238 | 6.93 |
| 10 | 35.00 | 20.00 | 24.50 | 91.10 | 32.21 | 19.83 | 305 | 70.4 |
| 11 | 29.50 | 20.00 | 30.00 | 129.40 | 23.67 | 19.93 | 355 | 45.21 |
| 12 | 24.75 | 24.75 | 30.00 | 120.20 | 17.36 | 21.80 | 327 | 19.46 |
| 13 | 35.00 | 24.50 | 20.00 | 85.40 | 34.70 | 21.35 | 219 | 74.07 |
| 14 | 20.00 | 29.50 | 30.00 | 201.90 | 12.19 | 21.10 | 314 | 4.59 |
| 15 | 31.45 | 23.35 | 24.70 | 113.30 | 29.55 | 21.85 | 274 | 51.83 |
| 16 | 27.90 | 26.70 | 24.90 | 125.20 | 23.42 | 21.55 | 260 | 22.25 |

Silicone hydrogel prepared with the above components produce films with generally high oxygen permeability. It is noted that the modulus of some of these films was too high for soft contact lens application.

Examples 17–30

Films Prepared with $M_2D_{25}$ Endcapped with 10% Mole Trimethylsilyl

This prepolymer was prepared by same procedure as above except that for the following amounts: $M_2$ 9.08 grams, $D_4$ 40.57 grams, $T_2$(hexamethyldisiloxane) 0.35 grams and acid 0.125 grams.

TABLE 2

Films prepared using $M_2D_{25}$ endcapped with 10% mole trimethylsilyl

| Example | DMA (parts) | TRIS (parts) | $M_2D_{25}$ (parts) | DK (Barrers) | $H_2O$ (%) | Weight Loss (%) | Modulus (g/mm²) | $H_2O$ trans |
|---|---|---|---|---|---|---|---|---|
| 17 | 20.00 | 39.50 | 20.00 | 200.00 | 11.69 | 17.42 | 163 | 1.16 |
| 18 | 23.95 | 33.10 | 22.45 | 160.40 | 18.04 | 19.47 | 191 | 9.53 |

TABLE 2-continued

Films prepared using $M_2D_{25}$ endcapped with 10% mole trimethylsilyl

| Example | DMA (parts) | TRIS (parts) | $M_2D_{25}$ (parts) | DK (Barrers) | $H_2O$ (%) | Weight Loss (%) | Modulus (g/mm$^2$) | $H_2O$ trans |
|---|---|---|---|---|---|---|---|---|
| 19 | 35.00 | 24.50 | 20.00 | 80.40 | 32.62 | 19.48 | 179 | 91.35 |
| 20 | 35.00 | 20.00 | 24.50 | 77.80 | 33.89 | 24.61 | 263 | 2.68 |
| 21 | 20.00 | 29.50 | 30.00 | 187.30 | 10.65 | 17.72 | 246 | 2.79 |
| 22 | 20.00 | 39.50 | 20.00 | 208.00 | 9.97 | 18.70 | 164 | 6.04 |
| 23 | 20.00 | 34.50 | 25.00 | 198.60 | 11.93 | 19.15 | 215 | 7.72 |
| 24 | 35.00 | 20.00 | 24.50 | 84.50 | 31.80 | 19.27 | 250 | 90.99 |
| 25 | 29.50 | 20.00 | 30.00 | 120.20 | 23.33 | 19.19 | 329 | 40.44 |
| 26 | 24.75 | 24.75 | 30.00 | 164.10 | 17.43 | 19.55 | 275 | 20.54 |
| 27 | 35.00 | 24.50 | 20.00 | 75.80 | 34.06 | 21.03 | 190 | 79.86 |
| 28 | 20.00 | 29.50 | 30.00 | 158.30 | 11.88 | 20.16 | 284 | 2.91 |
| 29 | 31.45 | 23.35 | 24.70 | 102.70 | 27.03 | 22.14 | 272 | 59.79 |
| 30 | 27.90 | 26.70 | 24.90 | 119.70 | 22.97 | 21.11 | 232 | 22.55 |

Films containing $M_2D_{25}$ endcapped with 10% mole trimethylsilyl showed a reduction in modulus as compared to Examples 3–16. The oxygen permeability was acceptable.

Examples 31–44

Films Prepared with $M_2D_{25}$ Endcapped with 25% Mole Trimethylsilyl

This prepolymer was prepared by same procedure as above except that for the following amounts: $M_2$ 8.98 grams, $D_4$ 40.14 grams, $T_2$ 0.88 grams and triflic acid 0.125 grams.

Films made with $M_2D_{25}$ endcapped with 25% mole trimethylsilyl showed a decrease modulus as compared to Examples 17–30.

Examples 45–46

Films Prepared with $M_2D_{25}$ Endcapped with 40% Mole Trimethylsilyl

This prepolymer was prepared by same procedure as above except that for the following amounts: $M_2$ 8.89 grams, $D_4$ 39.72 grams, $T_2$ 1.39 grams and triflic acid 0.125 grams.

TABLE 3

Films prepared using $M_2D_{25}$ endcapped with 25% mole trimethylsilyl

| Example | DMA (parts) | TRIS (parts) | $M_2D_{25}$ (parts) | DK (Barrers) | $H_2O$ (%) | Weight Loss (%) | Modulus (g/mm$^2$) | $H_2O$ trans |
|---|---|---|---|---|---|---|---|---|
| 31 | 20.00 | 39.50 | 20.00 | 126.60 | 12.17 | 18.34 | 137 | 0.65 |
| 32 | 23.95 | 33.10 | 22.45 | 134.40 | 18.21 | 18.68 | 158 | 7.47 |
| 33 | 35.00 | 24.50 | 20.00 | 92.50 | 33.67 | 18.84 | 161 | 69.93 |
| 34 | 35.00 | 20.00 | 24.50 | 79.00 | 35.04 | 21.71 | 227 | 90.15 |
| 35 | 20.00 | 29.50 | 30.00 | 67.30 | 12.44 | 24.39 | 250 | 1.96 |
| 36 | 20.00 | 39.50 | 20.00 | 156.50 | 9.56 | 20.23 | 139 | 4.53 |
| 37 | 20.00 | 34.50 | 25.00 | 169.90 | 11.08 | 18.77 | 181 | 8.43 |
| 38 | 35.00 | 20.00 | 24.50 | 87.40 | 32.65 | 20.96 | 232 | 91.11 |
| 39 | 29.50 | 20.00 | 30.00 | 129.50 | 25.59 | 20.36 | 282 | 68.92 |
| 40 | 24.75 | 24.75 | 30.00 | 201.10 | 18.96 | 20.84 | 241 | 17.73 |
| 41 | 35.00 | 24.50 | 20.00 | 87.50 | 34.89 | 21.93 | 155 | 89.85 |
| 42 | 20.00 | 29.50 | 30.00 | 126.70 | 12.80 | 21.54 | 165 | 2.57 |
| 43 | 31.45 | 23.35 | 24.70 | 92.80 | 29.32 | 21.91 | 209 | 59.53 |
| 44 | 27.90 | 26.70 | 24.90 | 142.00 | 24.58 | 21.56 | 197 | 29.18 |

TABLE 4

Films prepared using $M_2D_{25}$ endcapped with 40% mole trimethylsilyl

| Example | DMA (parts) | NVP (parts) | TRIS (parts) | $M_2D_{25}$ (parts) | DK (Barrers) | $H_2O$ (%) | Weight Loss (%) | Modulus (g/mm$^2$) |
|---|---|---|---|---|---|---|---|---|
| 45 | 17.50 | 17.50 | 24.50 | 20.00 | 72.90 | 35.05 | 32.50 | 126 |
| 46 | 17.50 | 17.50 | 24.50 | 20.00 | 76.30 | 36.03 | 23.81 | 120 |

Films containing $M_2D_{25}$ endcapped with 40% mole trimethylsilyl showed a reduction in modulus as compared to Examples 31–44.

Examples 47–48

Films Prepared with $M_2D_{25}$ Endcapped with 50% Mole Trimethylsilyl

This prepolymer was prepared by same procedure as above except that for the following amounts: $M_2$ 8.82 grams, $D_4$ 39.45 grams, $T_2$ 1.73 grams and triflic acid 0.125 grams.

TABLE 5

Films prepared using $M_2D_{25}$ endcapped with 50% mole trimethylsilyl

| Example | DMA (parts) | NVP (parts) | TRIS (parts) | $M_2D_{25}$ (parts) | DK (Barrers) | $H_2O$ (%) | Weight Loss (%) | Modulus (g/mm$^2$) |
|---|---|---|---|---|---|---|---|---|
| 47 | 17.50 | 17.50 | 24.50 | 20.00 | 65.30 | 36.55 | 24.33 | 109 |
| 48 | 17.50 | 17.50 | 24.50 | 20.00 | 76.30 | 35.53 | 24.86 | 103 |

Films containing $M_2D_{25}$, endcapped with 50% mole trimethylsilyl showed a reduction in modulus as compared to Examples 45, 46.

Many other modification and variations of the present invention are possible to the skilled practitioner in the field in light of the teachings herein. It is therefore understood that, within the scope of the claims, the present invention can be practiced other than as herein specifically described.

We claim:

1. A hydrogel formed from the polymerization product of a monomer mixture comprising:

(a) a mixture of polysiloxane prepolymers represented by formulae (I) and (II):

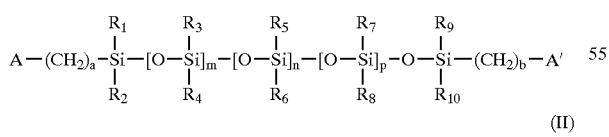

(I)

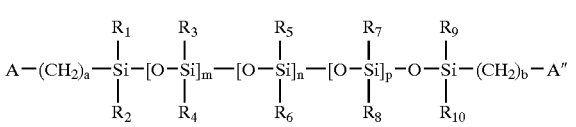

(II)

wherein:
each A and A' is an activated unsaturated radical;
A" is an alkyl group;

each $R_1$–$R_{10}$ is independently an alkyl, fluoroalkyl, alcohol, ether, or fluoroether group having 1–10 carbons, or an aromatic group having 6–18 carbons;
each m, n, and p are independently 0 to 200, m+n+p being from about 23 to 200;
each a is 1 to 10; and
each b is 0 to 10; and (b) a hydrophilic monomer, wherein the monomer mixture further comprises a monofunctional, ethylenically unsaturated silicone-containing monomer represented by the formula:

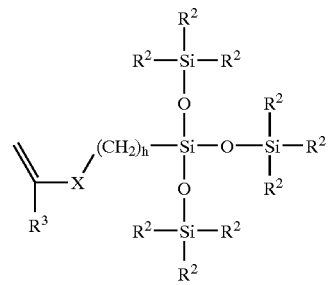

wherein:
X denotes —COO—, —CONR$^4$—, —OCOO—, or —OCONR$^4$— where each R$^4$ is independently H or lower alkyl; R$^3$ denotes hydrogen or methyl; h is 1 to 10; and each R$^2$ independently denotes a lower alkyl radical, a phenyl radical or a radical of the formula —Si(R$^5$)$_3$ wherein each R$^5$ is independently a lower alkyl radical or a phenyl radical.

2. The hydrogel of claim 1, said monofunctional, ethylenically unsaturated silicone-containing monomer includes methacryloxypropyl tris(trimethylsiloxy)silane.

3. The hydrogel of claim 1, wherein the hydrophilic monomer includes an acrylic-containing monomer.

4. The hydrogel of claim 3, wherein the hydrophilic monomer includes N,N-dimethyl acrylamide.

5. The hydrogel of claim 1, wherein the hydrophilic monomer includes a vinyl-containing monomer.

6. The hydrogel of claim 5, wherein said hydrophilic monomer includes N-vinyl pyrrolidone.

7. The hydrogel of claim 1, wherein the hydrophilic monomer includes at least one member selected from the group consisting of N,N-dimethylarcylamide and N-vinyl pyrrolidone.

8. The hydrogel of claim 1, wherein in Formulae (I) and (II), each A and A' is a readical represented by the formula:

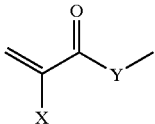

wherein X is hydrogen or methyl, and Y is —O— or —NH—.

9. The hydrogel of claim 8, wherein A" is methyl.

10. The hydrogel of claim 8, wherein in Formulae (I) and (II), each $R_1$–$R_{10}$ is an alkyl or a fluoroalkyl group.

11. The hydrogel of claim 10, wherein in Formulae (I) and (II), each $R_1$–$R_{10}$ is methyl.

12. The hydrogel of claim 10, wherein in Formulae (I) and (II), each m+n+p is within the range of 25 to 50.

13. The hydrogel of claim 10, wherein the prepolymer of Formula (ii) is present at 1 to 70 mole % based on total mole % of the Formulae (I) and (II) prepolymers.

14. The hydrogel of claim 13, wherein the prepolymer of Formula (II) is present at 25 to 50 mole % based on total mole % of the Formulae (I) and (II) prepolymers.

15. The hydrogel of claim 14, wherein the prepolymer of Formula (II) is present at 40 to 50 mole % based on total mole % of the Formulae (I) and (II) prepolymers.

16. A contact lens comprising the hydrogel of claim 1.

17. An intraocular lens comprising the hydrogel of claim 1.

18. A method of making a hydrogel, comprising:
(a) reacting a a cyclic siloxane and a dimethacrylate disiloxane in the presence of a catalyst and a disiloxane having the formula:

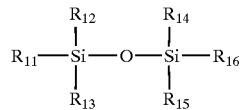

wherein $R_{11}$–$R^{16}$ are independently an alkyl group having 1–5 carbons, to form a mixture of polysiloxane prepolymers represented by formulae (I) and (II):

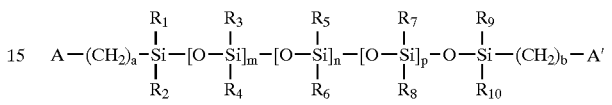

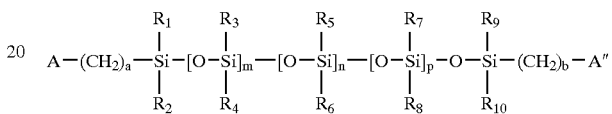

wherein;
each A and A' is an acitvated unsaturated radical;
A" is an alkyl group;
each $R_1$–$R_{10}$ is independently an alkyl, fluoroalkyl, alcohol, ether, or fluoroether group having 1–10 carbons, or an aromatic group having 6–18 carbons;
each m, n, and p are independently 0 to 200, m+n+p being from about 23 to 200;
each a is 1 to 10; and
each b is 0 to 10; and
(b) polymerizing a hydrophilic monomer with said mixture of polysiloxane prepolymers represented by formulae (I) and (II).

* * * * *